ably prepared by polymerizing or copolymeriz-
United States Patent Office 3,580,897
Patented May 25, 1971

3,580,897
PROCESS FOR PRODUCING HYDROGENATED HYDROCARBON POLYMERS
Toshio Yoshimoto, Tsuneaki Narumiya, Seiya Kaneko, Hiroshi Yoshii, and Tetsuya Takamatsu, Tokyo, Japan, assignors to Bridgestone Tire Company Limited, Tokyo, Japan
No Drawing. Filed Nov. 14, 1968, Ser. No. 775,922
Claims priority, application Japan, Nov. 27, 1967, 42/75,633
Int. Cl. C08d 5/02; C08f 27/25
U.S. Cl. 260—85.1
12 Claims

ABSTRACT OF THE DISCLOSURE

Hydrogenated hydrocarbon polymers can be obtained in a continuous step comprising polymerizing or copolymerizing conjugated 1,3-diolefin in an inert atmosphere and in an inert solvent by using a catalyst based on an alkali metal or an alkali metal hydrocarbyl to obtain a polymer solution and then mixing homogeneously an organic compound of nickel or cobalt soluble in the inert solvent with the resulting polymer solution without isolating the resulting polymer and catalytically hydrogenating the unsaturated bond of the resulting polymer. In this process the alkali metal or alkali metal hydrocarbyl in the polymerization catalyst, which remains in the resulting polymer after the polymerization acts to effect the reduction of the organic compound of nickel or cobalt to produce the hydrogenation catalyst.

The present invention relates to a process for producing hydrogenated hydrocarbon polymers. More particularly, the present invention relates to a process for producing hydogenated hydrocarbon polymers by hydrogenating hydrocarbon polymers prepared by the use of a catalyst based on an alkali metal or an alkali metal hydrocarbyl.

Usually, the hydrogenated hydrocarbon polymers are produced by hydrogenating the unsaturated bonds of the hydrocarbon polymers through the following steps. First, monomers comprising diolefins are polymerized by the use of a catalyst which can proceed polymerization reactions (a so-called polymerization catalyst) to form a polymer, the catalyst is deactivated or removed by adding a polymerization inhibitor, such as water and alcohol, to the polymerization system, the obtained polymer is recovered, purified and redissolved in a solvent suitable for hydrogenation if necessary, and then a hydrogenation catalyst is added to the obtained polymer solution, hydrogen is contacted with the solution and a hydrogenation is carried out.

As a catalyst for hydrogenation of the polymers, a reduced metal catalyst, such as Raney nickel and nickel kieselguhr is used. However, when such a heterogeneous catalyst is used, a comparatively large amount of catalyst, a high reaction temperature from 150° to 200° C. or more and a high hydrogen pressure are necessary in order to obtain high efficiencies of hydrogenation reaction because the polymer solution is highly viscous. When the hydrogenation of the polymers is conducted at such a high temperature, degradation of polymeric chains is liable to be caused in addition to hydrogenation and it is therefore difficult to obtain hydrogenated polymers suitable for producing rubber articles. Further, these heterogeneous hydrogenation catalysts are liable to be poisoned by impurities and therefore they are not suitable for the hydrogenation of polymers, the purification of which is difficult. It is also very difficult to remove such heterogeneous catalysts from the hydrogenated polymers after hydrogenation.

It is apparent that this complicated process and these catalysts with low activities are disadvantageous for industrial production of hydrogenated polymers.

It is an object of the present invention, therefore, to solve the above described defects of the process and to provide a new simple process for producing hydrogenated hydrocarbon polymers especially suitable for an industrial process. Another object of the present invention is to provide new hydrogenated hydrocarbon polymers suitable for manufacturing rubber articles, particularly used in severe conditions. Other and further objects of the present invention will become apparent to those skilled in the art upon consideration of the accompanying disclosure.

The present invention provides a process for producing hydrogenated hydrocarbon polymers which comprises the steps of (a) Polymerizing or copolymerizing conjugated 1,3-diolefin or copolymerizing conjugated 1,3-diolefin with vinyl-substituted aromatic hydrocarbon in an inert atmosphere and in an inert solvent by the use of a catalyst based upon an alkali metal or an alkali metal hydrocarbyl to form a "living" polymer solution, (b) Removing unpolymerized monomers from the resulting "living" polymer solution, (c) Mixing homogeneously at least one organic compound of nickel or cobalt soluble in said inert solvent with said solution and (d) Contacting the resulting mixture with hydrogen to effect catalytic hydrogenation of unsaturated bonds of said "living" polymer.

According to the present invention, it has become possible to produce hydrogenated hydrocarbon polymers by a very simple process which has never been obtained. Furthermore, a polymerization catalyst which has been used for polymerizing monomers can be re-used in order to form a hydrogenation catalyst and therefore it has become possible to produce hydrogenated hydrocarbon polymers advantageously in an industrial process.

We have also found that the molecular weight of the hydrogenated hydrocarbon polymer prepared by the process of the present invention, especially prepared by the lithium alkyl polymerization catalyst, is larger than that of the polymer before hydrogenation.

It has also become apparent that the hydrogenation catalyst used in the process of the present invention is very active and can carry out the selective hydrogenation of olefinically unsaturated bonds of a polymer in a viscous solution and under mild reaction conditions.

According to the present invention, hydrogenated hydrocarbon polymers can be produced advantageously in an industrial process from "living" polymers prepared by the use of a catalyst based upon an alkali metal or an alkali metal hydrocarbyl. The alkali metal includes lithium, sodium, potassium and the like. The solution of "living" polymer used in this specification means the solution of a polymer prepared by the use of a catalyst based upon an alkali metal or an alkali metal hydrocarbyl, to which polymerization inhibitors such as water and alcohol are not added. The "living" polymers are prefering conjugated 1,3-diolefin, or copolymerizing conjugated 1,3-diolefin with vinyl-substituted aromatic hydrocarbon. Any known method may be used for polymerizing or copolymerizing the abovementioned monomers by the use of a catalyst based upon an alkali metal or an alkali metal hydrocarbyl. Examples include a process for polymerizing or copolymerizing the monomers by the use of an alkali metal, an alkali metal alkyl or an alkali metal—polynuclei aromatic hydrocarbon complex, a process for copolymerizing the monomers by the use of a lithium alkyl together with grandomizers such as an ether, a thioether, a tertiary amine, an alkali metal alcolate and an alkali metal phenolate, a process for copolymerizing the monomers by the use of a lithium alkyl by introducing the monomers into the polymerization system at a lower rate than normal polymerization rate and a process for polymerizing or copolymerizing the monomers in the presence of a reaction product of sodium, arylhalide and olefin, which is so-called Alfin catalyst. Among them, the process for polymerizing the monomers comprising conjugated 1,3-diolefin by the use of a catalyst based upon a lithium alkyl is preferably used. Examples of the lithium alkyl include n-propyllithium, n-butyllithium, sec-butyllithium, tert-butyllithium, iso-butyllithium, n-pentyllithium, phenyllithium and the like. The conjugated 1,3-diolefins to be polymerized or copolymerized are, for example, butadiene, isoprene, piperylene and the like. The vinyl-substituted aromatic hydrocarbons which may be copolymerized with the above described conjugated 1,3-diolefins, are for example, styrene, 3-vinyltoluene, 4-ethylstyrene, 1-vinylnaphthalene, 2-vinylnaphthalene, 4-vinyltoluene and the like.

As is known to those skilled in the art, an amount of the polymerization catalyst, temperature, pressure or an inert solvent used for the polymerization, the ratio of the monomers to the inert solvent and so on should be selected depending upon the catalyst used and the monomers to be polymerized.

According to the present invention, after an organic compound of nickel or cobalt soluble in an inert solvent is mixed homogeneously with the viscous solution of "living" polymer which has been prepared by the use of a catalyst based upon an alkali metal or an alkali metal hydrocarbyl, hydrogen is contacted with the polymer solution to hydrogenate the unsaturated bonds of the polymer and then hydrogenated hydrocarbon polymers can be readily obtained.

The organic compound of nickel or cobalt in this specification includes also a partially reduced organic compound of nickel or cobalt soluble in an inert solvent.

After an organic compound of nickel or cobalt is mixed with the solution of "living" polymer prepared by polymerization or copolymerization, a reducing agent such as an organometallic compound of lithium, magnesium and aluminium can be also added to the solution if necessary.

When the soluble organic compound of nickel or cobalt is mixed with the solution of "living" polymer, it is reduced by the alkali metal or the alkali metal hydrocarbyl existing at the end of or around the "living" polymer to form a hydrogenation catalyst. The hydrogenation catalyst newly formed is soluble in the polymer solution to be hydrogenated and therefore the polymer, the catalyst and hydrogen can contact each other most homogeneously and then the hydrogenation reaction proceeds rapidly under mild reaction conditions, such as at room temperature and an atmospheric pressure of hydrogen. When an organic compound of nickel or cobalt insoluble in the polymer solution to be hydrogenated is mixed with the polymer solution, it does not react completely with an alkali metal or an alkali metal hydrocarbyl and therefore the hydrogenation does not often proceed at desirable rate.

As the inert solvent, use may be made of a solvent which neither deactivates a polymerization catalyst based upon an alkali metal or an alkali metal hydrocarbyl nor deactivates the hydrogenation catalyst newly formed. The inert solvents include a saturated hydrocarbon, an aromatic hydrocarbon, a hydrogenated aromatic hydrocarbon and the like. Among them, a saturated hydrocarbon, aromatic hydrocarbon and hydroaromatic hydrocarbon are preferably used. Examples of the inert solvent include hexane, heptane, octane, benzene, toluene, xylene, cyclohexane, methylcyclohexane, Decalin, Tetralin and the like.

As the organic compound of nickel or cobalt which is soluble in the inert solvent, the organic compounds, of which organic radicals are attached to the metal through oxygen, are preferably used. Among those, one of preferable compounds is a metal carboxylate having the formula $(RCOO)_nM$, wherein M is a metal selected from the group consisting of nickel and cobalt, R is a hydrocarbon radical having 1 to 50 carbon atoms, preferably from 5 to 30 carbon atoms and $n$ is a valence number of M. These metal carboxylates include nickel and cobalt salts of hydrocarbon aliphatic acid, hydrocarbon aromatic acid and hydrocarbon cycloaliphatic acid. Examples of hydrocarbon aliphatic acids include a hexanoic acid, a heptanoic acid, an octanoic acid, a nonanoic acid, a decanoic acid, a dodecanoic acid, a myristic acid, a palmitic acid, a stearic acid, a dodecenoic acid, an oleic acid, a linoleic acid, a rhodinic acid and the like. Examples of hydrocarbon aromatic acid include benzoic acid and alkyl-substituted aromatic acids in which alkyl has from 1 to 20 carbon atoms. These include t-butyl, 2-ethylhexyl-, dodecyl-, and nonylbenzoic acids and the like. Examples of cycloaliphatic acids include naphthenic acid, cyclohexylcarboxylic acid, abietic type resin acid and the like. Commercially available metallic soaps such as naphthenic acid salts, rosin acid salts, linoleic acid salts, oleic acid salts, stearic acid salts and tall oil salts may be used.

Other preferable organic compounds are metal chelate compounds, in which the chelating groups are attached to nickel or cobalt through a pair of two oxygen atoms. As the chelating groups, $\beta$-ketones, $\alpha$-hydroxycarboxylic acids, $\beta$-hydroxycarboxylic acids and $\beta$-hydroxycarbonyl compounds may be used. Examples of the $\beta$-ketones include acetylacetone, 1,3 - hexanedione, 3,5 - nonandione, methyl acetoacetate, ethyl acetoacetate and the like. Examples of the $\alpha$-hydroxycarboxylic acids include lactic acid, glycolic acid, $\alpha$-hydroxyphenylacetic acid, $\alpha$-hydroxy-$\alpha$-phenylacetic acid, $\alpha$-hydroxycyclohexylacetic acid and the like. Examples of the $\beta$-hydroxycarboxylic acids include salicylic acid, alkyl-substituted salicylic acid, and the like. Examples of the $\beta$-hydroxycarbonyl compounds include salicylaldehyde, o-hydroxyacetophenone and the like. Examples of the metal chelate compounds having above described chelating groups include bis(acetylacetone)nickel, tris(acetylacetone)cobalt, bis(ethyl acetoacetate)nickel, bis(ethyl acetoacetate)cobalt, bis(3,5 - diisopropylsalicylic acid)nickel, bis(salicylaldehyde)nickel, bis(salicylaldehyde)cobalt and the like.

An amount of the organic compound of nickel or cobalt mixed with the "living" polymer solution to be hydrogenated can be varied widely, but at least 0.1 mmol per liter of the solution is necessary because the catalyst with high activity is not formed, when the concentration does not reach 0.1 mmol per liter. The molar ratio of the organic compound of nickel or cobalt to the catalyst which has been used for preparing "living" polymer solution is 1:0.5 to 1:10, preferably 1:1 to 1:8 in order to obtain the active hydrogenation catalyst.

When using, for example, lithium alkyl as the polymerization catalyst, a "living" polymer having a high molecular weight can be obtained in an extremely small amount of the polymerization catalyst of lithium alkyl. In this case, in order that the molar ratio of the organic compound to the polymerization catalyst lies in the above defined range, the concentration of the organic compound of nickel or cobalt does not reach the above defined necessary amount of 0.1 mmol per liter of the "living" polymer solution to be hydrogenated. Namely, in order to effect the hydrogenation satisfactorily, it is necessary to supplement the insufficient amount of the polymerization catalyst and for the purpose the organic compound has been previously reduced partially prior to introducing the organic compound into the "living" polymer solution. Thus, it would be apparent to those skilled in the art that more than 0.1 mmol of partially reduced organic compound of nickel or cobalt should be used.

Alternatively, more than 0.1 mmol of organic compound of nickel or cobalt is mixed with the "living" polymer solution and then added with a reducing agent in a sufficient amount to supplement the insufficient amount of the polymerization catalyst.

In these procedures, the molar ratio of the organic compound of nickel or cobalt to the sum of the catalyst which has been used for preparing the "living" polymer and the reducing agent used for reducing the organic compound of nickel or cobalt partially or the reducing agent added to the "living" polymer solution for the supplement after added the organic compound of nickel or cobalt, which has not been reduced partially, is preferably 1:1 to 1:8.

As it is desirable that the partially reduced organic compound of nickel or cobalt is also soluble in an inert solvent, the organic compound reduced to such a degree that a metal deposit, is not included in the present invention, because it becomes insoluble. Reaction products soluble in an inert solvent obtained by reducing an organic compound of nickel or cobalt by an organometallic compound or a hydride of the metal of Group 1, 2 or 3 in the Periodic Table may be used as a hydrogenation catalyst, but it would be apparent to those skilled in the art that the organic compound is used in the present invention is not necessarily reduced to such a degree that the reduced organic compound can be used solely as the hydrogenation catalyst. Namely, the organic compound, even if it has been only partially reduced, is reduced furthermore by the alkali metal or an an alkali metal hydrocarbyl to form an active hydrogenation catalyst when it is mixed with the solution of "living polymer in which the polymerization catalyst still remains. In this procedure, the industrial advantage of the present invention exists. By this procedure, an amount of the reducing agent to be used can be reduced as compared with the case when the organic compound is reduced to such a degree that the reduced organic compound can be used as a hydrogenation catalyst, and then mixed with the polymer solution. It would be apparent to those skilled in the art that such advantageous merits can only be obtained when hydrogenerated hydrocarbon polymers are prepared from hydrocarbon polymers polymerized by the use of a catalyst based upon an alkali metal or an alkali metal hydrocarbyl. Namely, the merit of the present invention is to re-use an alkali metal or an alkali metal hydrocarbyl which has been used for polymerization for preparing a hydrogenation catalyst. It can not be anticipated from the prior art that the active hydrogenation catalyst can be obtained by such procedure. Further, when an organic compound of nickel or cobalt is mixed with the solution of "living" polymer after polymerization inhibitors such as alcohol and water is added to the solution, advantageous effects of the present invention an never be obtained.

According to the present invention can be obtained the hydrogenated hydrocarbon polymer having increased molecular weight compared with the hydrocarbon polymer prior to hydrogenation. This is one of merits of the present invention and is obtained especially when the lithium alkyl catalyst is used for polymerizing monomers comprising conjugated 1,3-diolefins. In the case when an organic compound of nickel or cobalt is mixed with the "living" polymer solution after the polymerization inhibitor is added to the solution, the increase of the molecular weight is not observed. These facts show that the process of the present invention is complicated and is not a simple hydrogenation process.

As the reducing agent which is used in order to reduce the organic compound of nickel or cobalt partially to form a reaction mixture soluble in an inert solvent, an organometallic compound or a hydride of the metal of Group 1, 2 or 3 of Periodic Table may be used. The organometallic compounds having the formula of $M'R'_{n'}$, wherein $M'$ is a metal selected from the group consisting of lithium, magnesium and aluminium, $R'$ is selected from the group consisting of hydrocarbon radical having from 1 to 12 carbon atoms, hydrogen and an alkoxy radical having from 1 to 12 carbon atoms and $n'$ is the valence number of $M'$, are preferably used.

The hydrocarbon radical includes and alkyl, aryl, alkaryl, aralkyl and cycloaliphatic group. Examples of such radicals include methyl, ethyl, n-propyl, i-propyl, n-butyl, i-butyl, sec-butyl, t-butyl, pentyl, hexyl, heptyl, octyl, nonyl, decyl, dodecyl, phenyl, benzyl, tolyl, cyclopentyl, cyclohexyl, cyclohexenyl and naphthyl radicals. The group combined to oxygen in the alkoxy radical is exemplified as described above too.

Examples of such organometallic compounds include ethyllithium, n-propyllithium, n-butyllithium, i-butyllithium, sec-butyllithium, t-butyllithium, n-pentyllithium, phenyllithium, diethylmagnesium, di-n-propylmagnesium, di-n-butylmagnesium, diphenylmagnesium, triethylaluminium, tri-n-propylaluminium, triisopropylaluminium, tri-n-butylaluminium, triisobutylaluminium, triamylaluminium, trihexylaluminium, trioctylaluminium, tridodecylaluminium, diethylisobutylaluminium, diethyloctylaluminium, tricyclohexylaluminium, triphenylaluminium, didodecylaluminiumhydride, diisobutylaluminiumhydride, diethylaluminiumethoxide, dibutylaluminiumbutoxide and their mixtures. Among them, a trialkylaluminium is more preferably used. In addition to the above mentioned compounds, the organometallic compounds and the metal hydrides having two kinds of metals such as lithiumaluminiumtetrabutyl, lithiumaluminiumhydride and sodiumborohydride may be used.

It is preferable to remove unpolymerized monomers from the solution of "living" polymer prepared by the use of a catalyst based upon an alkali metal or an alkali metal hydrocarbyl before an organic compound of nickel or cobalt is mixed with the polymer solution, because it has a tendency to hinder the formation of an active hydrogenation catalyst. Further, it is preferable to decrease the viscosity of the polymer solution by adding an inert solvent which can dissolve the polymer to be hydrogenated until the sufficient gas-liquid contact can be obtained in a desired reactor for hydrogenation. The temperature of hydrogenation and hydrogen pressure can be varied widely. When the hydrogenation is carried out at a temperature of from 0° to 120° C. and hydrogen pressure of less than 50 atms., preferably less than 10 atms., olefinically unsaturated bonds of the polymer can be selectively hydrogenated. Further, when temperature of more than 120° C. and hydrogen pressure of more than 50 atms. are used, aromatic nuclei of the polymer can also be hydrogenated. It is one of merits of the present invention that the polymer in viscous solution can be hydrogenated selectively with high activity. However, olefinically unsaturated bonds of polymer can be completely hydrogenated in a short time under mild conditions such as at room temperature and an atmospheric pressure of hydrogen and therefore the process of the present invention is suitable for hydrogenating selectively olefinically unsaturated bonds of polymers.

After hydrogenation, removal of solvent and catalysts from the hydrogenated polymers is easily carried out by adding polar solvent such as acetone and alcohol to the reaction mixtures and precipitating the polymers, or pouring the reaction products into a steam or a hot water and removing solvent by azeotropic distillation. In these procedures, catalysts are decomposed and the major part of them is removed from the polymers, but the most effective removal of the catalysts is attained by contacting the reaction mixture with polar solvent or water containing a small amount of acid.

According to the present invention, polymers of high Mooney viscosity even more than 40 can be easily hydrogenated under the mild condition wherein side reaction such as thermal degradation or gelation does not occur, and so the obtained polymers have no inferior properties resulted from the decrease of molecular weight or gel. For example, the vulcanized hydrogenated styrene-butadiene random copolymers prepared by the process of the present invention have high tensile strength, high resilience, excellent heat resistance and these three desirable properties are harmonized. More particularly, the hydrogenated styrene-butadiene random copolymers have excellent properties such as large hardness, high 300% modulus and extremely high tensile strength in the unvulcanized state which can never be obtained from the commonly used rubbers. Further, the hydrogenated styrene-butadiene copolymers can be mixed with a large amount of process oil and the obtained oil-extended rubber has high tensile strength in the unvulcanized state, and also can be mixed with inorganic reinforcing fillers and the obtained rubbery composition has extremely high tensile strength which cannot be obtained without vulcanization in the case of commonly used rubbers. The hydrogenated polybutadiene obtained by the process of the invention has improved green strength, improved cold flow property and others. The hydrogenated polybutadiene suitable for manufacturing rubber articles can be obtained when a small amount of butadienic units of the polybutadiene is hydrogenated. The hydrogenated polybutadiene having degree of hydrogenation less than 20% is preferably used in manufacturing rubber articles. The hydrogenated polybutadiene having degree of hydrogenation less than 10% is more preferably used because of its good processibilities. In order to prepare such hydrogenated polybutadiene, the process of the present invention is advantageously utilized.

These hydrogenated polymers of the present invention has property of roll processibility or extrusion. Further, these hydrogenated polymers can be used by blending with common rubbers and are easily curable by the conventional procedure and may be applied to the production of rubber articles.

The invention is illustrated in the greater detail in the following examples which are not intended, however, to be unduly limitative of the invention.

EXAMPLE 1

In a glass autoclave, 10 ml. of liquid butadiene, n-butyl lithium and tetrahydrofuran in No. 3 only in the following Table 1 were placed and after toluene was added to the obtained mixtures until total volume became 50 ml., the inside of the autoclave was reduced to vacuum and the autoclave was sealed. Then polymerization was carried out at 40° C. under shaking. Tetrahydrofuran in No. 3 was used in order to obtain polybutadiene with high vinyl content. After 5 hours, unpolymerized butadiene was removed by reducing the pressure of the inside of the autoclave, the organic compound of nickel or cobalt was mixed with the obtained "living" polymer solution at 80° C., atmospheric pressure of hydrogen was contacted with the solution and then hydrogenation was carried out at 30° C. under shaking. An amount of hydrogen absorbed was measured continuously by a gas burette. An amount of n-butyllithium and tetrahydrofuran used in the polymerization, an amount of the organic compound of nickel or cobalt mixed with the "living" polymer solution and an amount of hydrogen absorbed in 1 hour are shown in the following Table 1.

TABLE 1

| No. | n-Butyl-lithium (mmol) | Tetrahydrofuran (mmol) | Organic compound of nickel or cobalt (mmol) | Amount of hydrogen absorbed (ml.) |
|---|---|---|---|---|
| 1 | 1.5 | | Nickel naphthenate | 466 |
| 2 | 1.5 | | Bis(acetylacetone) nickel | 545 |
| 3 | 1.0 | 2.0 | do | 624 |
| 4 | 1.5 | | Cobalt naphthenate | 220 |

After 1 hour the contact of hydrogen with the polymer solution was stopped and acetone containing a small amount of hydrochloric acid was added to the polymer solution under shaking, after which the obtained mixtures were mixed with methanol to precipitate the hydrogenated polymer. After drying under a reduced pressure, white, rubbery hydrogenated polybutadiene was obtained. The infrared spectrum of this polymer showed peaks at 721 cm.$^{-1}$ and 1,380 cm.$^{-1}$ assigned to —$(CH_2)_4$— and —$CH_3$ of hydrogenated butadienic units respectively.

EXAMPLE 2

In the same autoclave as used in Example 1, 10 ml. of liquid butadiene, 2 ml. of styrene and 3 mmol of tetrahydrofuran in No. 2 only in the following Table 2 were placed and after toluene was added to the obtained mixture until total volume became 50 ml., the inside of the autoclave was reduced to vacuum and the autoclave was sealed. Then polymerization was carried out at 40° C. under shaking. Tetrahydrofuran in No. 2 was used in order to obtain random styrene-butadiene copolymer. After 5 hours, 0.5 mmol. of nickel naphthenate was mixed with the obtained "living" polymer solution at 80° C., atmospheric pressure of hydrogen was contacted with the solution and then hydrogenation was carried out at 30° C. under shaking. An amount of hydrogen absorbed was measured continuously by a gas burette. The conversion of styrene was checked by sampling after 5 hours after the beginning of polymerization and it was 100%.

An amount of hydrogen absorbed in 1 hour is shown in the following Table 2.

TABLE 2

| No. | Tetrahydrofuran | Amount of hydrogen absorbed (ml.) |
|---|---|---|
| 1 | No | 680 |
| 2 | Yes | 396 |

One hour after the beginning of hydrogenation, the obtained mixtures were treated in the same manner as shown in Example 1. The hydrogenated styrene-butadiene block copolymer and the hydrogenated styrene-butadiene random copolymer were obtained in Nos. 1 and 2 respectively. The infrared spectrum of the obtained polymer of No. 2 showed peaks at 721 cm.$^{-1}$ and 1,380 cm.$^{-1}$ assigned to —$(CH_2)_4$— and $CH_3$— of hydrogenated butadienic unit respectively, peaks at 967 cm.$^{-1}$ and 910 cm.$^{-1}$ assigned to trans-1,4-configuration and vinyl radical of butadienic unit respectively and peaks at 699 cm.$^{-1}$ to 757 cm.$^{-1}$ assigned to phenyl radical of styrenic unit.

EXAMPLE 3

In the same autoclave as used in Example 1, 10 ml. of liquid butadiene or mixtures of 10 ml. of liquid butadiene and 2 ml. of styrene and 1.5 mmol. of n-butyllithium were placed and after toluene was added to the obtained mixtures until total volume became 50 ml., the inside of the autoclave was reduced to vacuum and the autoclave was sealed. Then the polymerization was carried out at 40° C. under shaking. After 5 hours, 0.5 mmol of an organic compound of nickel or cobalt was mixed with the obtained "living" polymer solution at 80° C., atmospheric pressure of hydrogen was contacted with the solution and then hydrogenation was carried out at 30° C. under shaking. An amount of hydrogen absorbed was measured continuously by a gas burette. The conversion of styrene was checked by sampling 5 hours after the beginning of polymerization and it was 100%.

An amount of hydrogen absorbed in 1 hour is shown in the following Table 3.

TABLE 3

| No. | Polymerization | Organic compound of nickel or cobalt | Amount of hydrogen absorbed (ml.) |
|---|---|---|---|
| 1 | Butadiene | Cobalt octanoate | 807 |
| 2 | do | Bis(3,5-diisopropyl salicylic acid) nickel | 136 |
| 3 | do | Bis(ethylacetoacetate)nickel | 283 |
| 4 | Butadiene/styrene | Nickel octanoate | 92 |
| 5 | do | Cobalt octanoate | 1,518 |

EXAMPLE 4

In the same reactor as used in Example 1, 10 ml. of liquid butadiene and 1 mmol. of n-butyllithium were placed and after toluene was added to the obtained mixture until total volume became 50 ml., the inside of the autoclave was reduced to vacuum and the autoclave was sealed. Then the polymerization was carried out at 40° C. under shaking. After 5 hours, unpolymerized butadiene was removed by reducing the pressure of the inside of the autoclave, 0.3 mmol. of nickel naphthenate partially reduced by triethylaluminium in the presence of 1,7-octadiene was mixed with the obtained "living" polymer solution. Then the hydrogenation was carried out at 30° C. under shaking. An amount of hydrogen absorbed was measured continuously by a gas burette.

An amount of hydrogen absorbed in 1 hour is shown in the following Table 4.

TABLE 4

| No. | Al/Ni (molar ratio) | Amount of hydrogen absorbed (ml.) |
|---|---|---|
| 1 | 0.375 | 440 |
| 2 | 0.75 | 1,280 |
| 3 | 2.0 | 1,455 |
| 4 | 3.0 | 1,032 |

EXAMPLE 5

The same polymerization as shown in Example 4 was carried out. After 5 hours, unpolymerized butadiene was removed from the obtained "living" polymer solution by reducing the pressure of the inside of the autoclave, 0.3 mmol. of nickel naphthenate was mixed with the solution at 80° C., then triethylaluminium was added, atmospheric pressure of hydrogen was contacted and the hydrogenation was carried out at 30° C. under shaking. An amount of hydrogen absorbed was measured continuously by a gas burette.

An amount of hydrogen absorbed in 1 hour is shown in the following Table 5.

TABLE 5

| No. | Al/Ni (molar ratio) | Amount of hydrogen absorbed (ml.) |
|---|---|---|
| 1 | 0.25 | 460 |
| 2 | 0.50 | 529 |
| 3 | 1.0 | 753 |
| 4 | 2.0 | 859 |
| 5 | 3.0 | 44 |

When hydrogenation catalyst is prepared by reducing nickel naphthenate by triethylaluminium, the catalyst with the highest activity can be obtained when the molar ratio of aluminum to nickel is 3. Therefore, Examples 4 and 5 show that an amount of the reducing agent can be reduced according to the present invention when the hydrogenation catalyst is prepared.

EXAMPLE 6

In a mechanically stirred autoclave, 34.66 mol of liquid butadiene, 6.00 mol of styrene, 10 kg. of n-hexane, 122 mmol of n-butyllithium and 122 mmol of tetrahydrofuran were placed and the polymerization was carried out at 70° C. for 4 hours under stirring. The conversion of styrene was checked by sampling and it was 100 percent. After 4 hours, the pressure of the inside of the autoclave was reduced and replaced by hydrogen. 5 kg. of toluene and 41 mmol of nickel naphthenate were mixed with the obtained polymer solution. Then, hydrogenation of butadiene units was carried out at 60° C. under 2 kg./cm.$^2$ pressure of hydrogen. After 20 minutes, the hydrogenated styrene-butadiene random copolymer was obtained. Degree of hydrogenation based upon the theoretical value of 100 percent for the completely hydrogenated polymer was 16.7 percent.

EXAMPLE 7

In a mechanically stirred autoclave, 34.66 mol of liquid butadiene, 6.00 mol of styrene, 10 kg. of n-hexane, 24.4 mmol of n-butyllithium and 24.4 mmol of tetrahydrofuran were placed and the polymerization was carried out at 40° C. for 9 hours under stirring. The conversion of styrene was checked by sampling and it was 100 percent. After 9 hours, the pressure of the inside of the autoclave was reduced and replaced by hydrogen.

Then, the partially reduced nickel naphthenate, which had been prepared by reacting 68 mmol of nickel naphthenate with 113.6 mmol of triethylaluminium in the presence of 68 mmol of 1,7-octadiene in 1.3 l. of toluene for 10 minutes, was mixed with the obtained polymer solution and the hydrogenation of butadiene units was carried out at 60° C. under 2 kg./cm.$^2$ pressure of hydrogen. After 65 minutes, the hydrogenated styrene-butadiene random copolymer was obtained. Degree of hydrogenation was 75 percent.

The microstructure of the obtained polymer before hydrogenation is shown in the following Table 6, which was determined by the infrared spectrum.

TABLE 6

| | Percent by weight |
|---|---|
| Styrene content | 25.0 |
| Cis-1.4 | 22.5 |
| Trans-1.4 | 31.3 |
| Vinyl | 46.2 |

The molecular weight of the obtained polymer was $2.33 \times 10^5$ before hydrogenation and $4.66 \times 10^5$ after hydrogenation respectively, which were determined by the osmotic pressure of the polymer solution in toluene at 37° C.

This fact shows that the process of the present invention is not a simple hydrogenation process.

EXAMPLE 8

In a mechanically stirred autoclave, liquid butadiene, styrene, n-hexane, n-butyllithium and potassium tert-butoxide were placed. The volume ratio of total monomers to n-hexane was 1:4 and the molar ratio of n-butyllithium/potassium tert-butoxide/total monomers was 0.7/0.07/1,000. Then, the polymerization was carried out at 40° C. for 9 hours. The conversion of styrene was 100 percent and the styrene content in the obtained styrene-butadiene random copolymer measured by infrared spectrum was 24.3 percent by weight. After 9 hours, 1 l. of the obtained "living" polymer solution was taken out to a glass reactor for hydrogenation and 3 mmol of partially reduced bis(acetylacetone)nickel, which had been prepared by reacting 3 mmol of bis(acetylacetone)nickel with 6 mmol of triethylaluminium in the presence of 3 mmol of 1,7-octadiene and toluene at room temperature for 10 minutes, was mixed with the solution and then the hydrogenation was carried out at room temperature and under atmospheric pressure of hydrogen.

The intrinsic viscosity was measured at 30° C. in toluene. The intrinsic viscosity of the hydrogenated styrene-butadiene random copolymer and the non-hydrogenated copolymer is shown in the following.

TABLE 7

| Degree of hydrogenation(percent): | Intrinsic viscosity |
|---|---|
| 0 | 2.90 |
| 25 | 3.43 |
| 50 | 4.00 |
| 75 | 4.34 |

EXAMPLE 9

In the same manner as shown in Example 7, except that 2.44 mmol of potassium tert-butoxide was used instead of 24.4 mmol of tetrahydrofuran, styrene-butadiene random copolymer and the hydrogenated styrene-butadiene random copolymer were prepared. The number averaged molecular weight of the hydrogenated copolymers was about $2 \times 10^{-5}$. The microstructure of the styrene-butadiene random copolymer is shown in the following Table 8.

TABLE 8

| | Percent by weight |
|---|---|
| Styrene content | 25.4 |
| Cis-1.4 | 28.0 |
| Trans-1.4 | 38.7 |
| Vinyl | 7.9 |

Physical properties of the obtained polymers were tested. Compounding recipe and results are shown in the following Table 9.

TABLE 9

| | Styrene-butadiene random copolymer | Hydrogenated styrene-butadiene random copolymer | |
|---|---|---|---|
| Degree of hydrogenation, percent | | 20 | 47 |
| Compounding recipe: | | | |
| Polymer | | 100 | |
| Aromatic oil | | 37.5 | |
| Carbon black ISAF [1] | | 70 | |
| Stearic acid | | 2 | |
| Paraffin wax | | 3 | |
| Phenylisopropyl-p-phenylenediamine | | 2 | |
| Zinc oxide | | 3 | |
| Sulphur | | 1.5 | |
| Dibenzothiazyl disulfide | | 1.5 | |
| After cured at 145° C.×35 minutes | | | |
| Physical properties: | | | |
| Hardness (JIS) | 52 | 58 | 64 |
| Elongation, percent | 710 | 590 | 480 |
| 100% modulus (kg./cm.²) | 12 | 19 | 22 |
| 300% modulus (kg./cm.²) | 65 | 100 | 132 |
| Tensile strength (kg./cm.²): | | | |
| At room temperature | 191 | 194 | 222 |
| At 80° C | 116 | 120 | 130 |
| At 120° C | 95 | 96 | 104 |
| Tear (kg./cm.²) | 51 | 53 | 56 |
| Resilience, percent: | | | |
| At room temperature | 37.8 | 41.3 | 46.4 |
| At 80° C | 46.6 | 50.2 | 56.4 |
| At 120° C | 53.4 | 57.3 | 62.0 |
| Pico abrasion: | | | |
| 60 r.p.m., 2,154 kg | 12.5 | 13.8 | 12.0 |
| 120 r.p.m., 2,154 kg | 13.6 | 13.9 | 12.7 |
| 60 r.p.m., 4,300 kg | 24.2 | 23.3 | 19.1 |

[1] Abbreviation of Intermediate Super Abrasion Furnace.

What we claim is:

1. A process for producing hydrogenated hydrocarbon polymers which comprises the steps of
   (a) preparing a "living" polymer solution selected from the group consisting of a "living" polymer solution obtained by polymerizing conjugated 1,3-diolefin and a "living" polymer solution obtained by copolymerizing conjugated 1,3-diolefin with styrene in an inert atmosphere and in an inert solvent selected from the group consisting of a saturated hydrocarbon, an aromatic hydrocarbon and a hydrogenated aromatic hydrocarbon by the use of an effective amount of an alkyl lithium,
   (b) removing unpolymerized monomers from said "living" polymer solution,
   (c) mixing homogeneously an organic compound soluble in said "living" polymer solution with said "living" polymer solution, said organic compound being selected from the group consisting of a metal carboxylate having the formula $(RCOO)_nM$, wherein M is a metal, R is a hydrocarbon radical having from 1 to 50 carbon atoms and $n$ is the valence number of M, and a metal of nickel or cobalt chelate compound of which chelating groups are B-ketones, a-hydroxycarboxylic acids, B-hydroxycarboxylic acids or B-hydroxycarbonyl compounds wherein said metal is nickel or cobalt, whereby the concentration of said organic compound is at least 0.1 mmol per a litre of said "living" polymer solution and the molar ratio of said organic compound to said alkyl lithium is from 1:0.5 to 1:10 and
   (d) contacting the resulting mixture with hydrogen to effect catalytic hydrogenation of unsaturated bonds of said "living" polymer at a temperature of from 0° to 120° C.

2. The process as claimed in claim 1, wherein said conjugated 1,3-diolefin is butadiene.

3. The process as claimed in claim 1, wherein said conjugated 1,3-diolefin is isoprene.

4. The process as claimed in claim 1, wherein said alkyllithium is butyllithium.

5. The process as claimed in claim 1, wherein said metal carboxylate is metal naphthenate.

6. The process as claimed in claim 1, wherein said metal carboxylate is metal octanoate.

7. The process as claimed in claim 1, wherein said B-ketone is acetylacetone.

8. The process as claimed in claim 1, wherein said B-ketone is ethylacetonacetate.

9. The process as claimed in claim 1, wherein said B-hydroxycarboxylic acid is 3,5-diisopropyl salicylic acid.

10. The process as claimed in claim 1, wherein said organic compound is partially reduced by a trialkylaluminum of which alkyl radical has from 1 to 12 carbon atoms, whereby the molar ratio of said organic compound to the sum of said alkyllithium and said trialkylaluminum is from 1:1 to 1:8.

11. The process as claimed in claim 1, wherein the pressure of said hydrogen is not more than 10 atms.

12. A process for producing hydrogenated hydrocarbon polymers which comprises the steps of
   (a) preparing a "living" polymer solution selected from the group consisting of a "living" polymer solution obtained by polymerizing conjugated 1,3-diolefin and a "living" polymer solution obtained by copolymerizing conjugated 1,3-diolefin with styrene in an inert atmosphere and in an inert solvent selected from the group consisting of a saturated hydrocarbon, an aromatic hydrogen and a hydrogenated aromatic hydrocarbon by the use of an effective amount of an alkyl lithium,
   (b) removing unpolymerized monomers from said "living" polymer solution,
   (c) mixing homogeneously an organic compound soluble in said "living" polymer solution with said "living" polymer solution, said organic compound being selected from the group consisting of a metal carboxylate having the formula $(RCOO)_nM$, wherein M is a metal, of nickel or cobalt, R is a hydrocarbon radical having from 1 to 50 carbon atoms and $n$ is the valence number of M, and a metal chelate compound of which chelating groups are B-ketones, a-hydroxycarboxylic acids, B-hydroxycarboxylic acids or B-hydroxycarbonyl compound wherein said metal is nickel or cobalt, whereby the concentration of said organic compound is at least 0.1 mmol per a litre of said "living" polymer solution,
(d) mixing homogeneously a trialkylaluminum of which alkyl radical has from 1 to 12 carbon atoms, whereby the molar ratio of said organic compound to the sum of said alkyllithium and said trialkylaluminum is from 1:1 to 1:8, and
(e) contacting the resulting mixture with hydrogen to effect catalytic hydrogenation of unsaturated bonds of said "living" polymer at a temperature of from 0° to 120° C.

References Cited
UNITED STATES PATENTS
3,113,986  12/1963  Breslow et al. ____ 260—94.7UX
FOREIGN PATENTS
863,256  3/1961  Great Britain _____ 260—85.1

JOSEPH L. SCHOFER, Primary Examiner
W. F. HAMROCK, Assistant Examiner

U.S. Cl. X.R.
260—94.7, 96